(12) United States Patent
Tokumoto

(10) Patent No.: US 8,531,717 B2
(45) Date of Patent: Sep. 10, 2013

(54) IMAGE PROCESSING ENABLING REDUCTION OF PROCESSING TIME FOR DATA CONVERSION

(75) Inventor: Hirokazu Tokumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1001 days.

(21) Appl. No.: 12/367,953

(22) Filed: Feb. 9, 2009

(65) Prior Publication Data

US 2009/0201554 A1    Aug. 13, 2009

(30) Foreign Application Priority Data

Feb. 13, 2008 (JP) ................................. 2008-032268

(51) Int. Cl.
*H04N 1/40* (2006.01)

(52) U.S. Cl.
USPC ........................................ 358/1.16; 358/468

(58) Field of Classification Search
USPC ................. 358/1.9, 2.1, 1.2, 1.16, 1.18, 1.13, 358/500, 504, 400, 406, 530, 426.02, 468
See application file for complete search history.

(56) References Cited

U.S. PATENT DOCUMENTS

| | | | |
|---|---|---|---|
| 7,023,569 B2 | 4/2006 | Kizaki | |
| 7,460,255 B2 | 12/2008 | Kizaki | |
| 7,916,968 B2 * | 3/2011 | Li et al. | 382/274 |
| 7,965,409 B2 * | 6/2011 | Lin | 358/1.2 |
| 2002/0051166 A1 | 5/2002 | Tomita | 358/1.13 |
| 2002/0051203 A1 | 5/2002 | Kizaki | |
| 2006/0007481 A1 | 1/2006 | Kato et al. | 358/1.15 |
| 2006/0109494 A1 | 5/2006 | Kizaki | |

FOREIGN PATENT DOCUMENTS

| | | |
|---|---|---|
| JP | 2001-356893 | 12/2001 |
| JP | 2002-337430 A | 11/2002 |
| JP | 2003-060902 A | 2/2003 |
| JP | 2006-23942 | 1/2006 |

OTHER PUBLICATIONS

Japanese Office Action dated Jun. 12, 2012, in counterpart Japanese Application No. 2008-032268.

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

A reference level of data required for outputting (printing, sending and so on) in accordance with output configuration settings is set. It is determined whether or not a level of target data to be output which is stored in a storage is lower than the reference level. When the level of the target data is lower than the reference level, the data level is increased in stages. The data of the level raised to the reference level is output in accordance with the output configuration settings.

7 Claims, 12 Drawing Sheets

| DATA LEVEL | FUNCTION | SUITABLE DATA FORM | |
|---|---|---|---|
| LEVEL5 | SCALABLE PDF GENERATION |  | BEZIER CURVE |
| LEVEL4 | SCALING REDUCTION LAYOUT |  | SET OF BEZIER CURVES |
| LEVEL3 | OBJECT EDITING FRAME ERASURE |  | POINT SEQUENCE |
| LEVEL2 | SEARCHABLE PDF GENERATION |  | BITMAP+BLOCK INFORMATION STRING "C" |
| LEVEL1 | IMAGE PROCESSING |  | BITMAP |

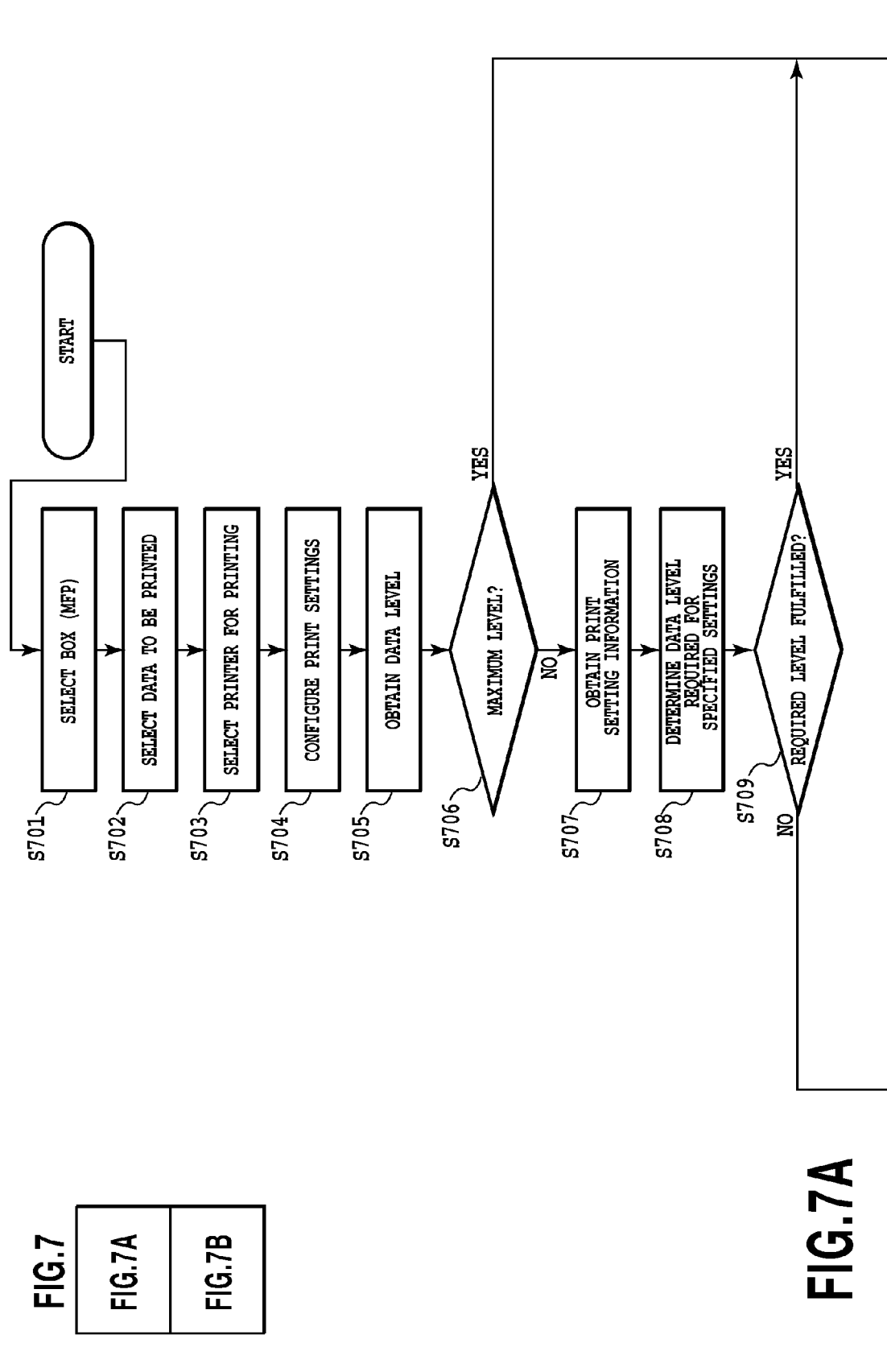

IMAGE PROCESSING ENABLING REDUCTION OF PROCESSING TIME FOR DATA CONVERSION

BACKGROUND OF THE INVENTION

1. Field of the Invention

This invention relates to an image processing apparatus, an image processing method and a computer-readable medium. In particular, the present invention relates to an image processing apparatus which performs the vectorization processing and rasterizing a bitmap image and page description language for conversion into a data level optimal for the specified output settings, a method for controlling the image processing apparatus and a computer-readable medium which stores a program for controlling the image processing apparatus.

2. Description of the Related Art

A bitmap (BMP) image or PDL (Page Description Language), which has been input to an image processing apparatus, is stored as a file in a secondary storage unit in the image processing apparatus. This will enable the operator (user) to select arbitrary time and output settings for the output in an arbitrary data format. Conventionally, a technique of determining a suitable data format in accordance with output settings and then spooling the data in the determined format has been developed (for example, Japanese Patent Laid-Open No. 2001-356893).

The function and the file system for preserving data input in a secondary storage unit of an image processing apparatus in a file format for the purpose of reuse are called Box function and Box, respectively. The files in the Box are bitmap images and/or PDL, which are required to be vectorized or rasterized in the image processing apparatus in order to conform with the specified output settings and an output data format. Vectorization refers to the process of converting a bitmap image into vector data maintaining the quality of output even in the enlarging/reducing process without relying on resolution (for example, Japanese Patent Laid-Open No. 2006-23942). Rasterizing is the process of converting vector data into resolution-independent raster data such as a bitmap image.

Regarding Japanese Patent Laid-Open No. 2001-356893, consideration is given to, for example, the case where the host has determined before transmission that a bitmap image is optimum, and then the bitmap image is stored in the secondary storage unit in the image processing apparatus. In this case, there is a problem that the necessity of the vectorization processing or rasterizing a file stored in the secondary storage unit arises depending on the output settings or output data format specified by the user. Specifically, when the user specifies enlarged printing for the stored file, the resolution-independent vectorization is necessary to maintain the quality of output.

Japanese Patent Laid-Open No. 2006-23942 requires a series of processes for parsing and approximating data to vectorize or rasterize a file stored in the secondary storage unit, resulting in a long conversion time.

SUMMARY OF THE INVENTION

It is an object of the present invention to provide an image processing apparatus, an image processing method and a computer-readable medium which enable a speedup of data conversion processing by means of an optimization of a performance and a function of generating and outputting data.

To solve this problem, the present invention provides an image processing apparatus which comprises: output setting means for making output configuration settings applied when data stored in a storage is output; reference level setting means for setting a reference level required for the data when the data is outputted in accordance with the output configuration settings; determination means for determining whether or not a level of the data stored in the storage is lower than the reference level; generation means for generating a raised data of which level is increased to the reference level by increasing the level of the data stored in the storage when the determination means determines that the level of the data stored in the storage is lower than the reference level; and output means for outputting the raised data generated by the generation means in accordance with the output configuration settings when the determination means determines that the level of the data stored in the storage is lower than the reference level, wherein the output means outputs the data stored in the storage in accordance with the output configuration settings when the determination means determines that the level of the data stored in the storage is no lower than the reference level.

To solve the aforementioned problem, the present invention provides an image processing method for controlling an image processing apparatus comprising a storage storing data, the method comprising the steps of: making output configuration settings applied when the data stored in the storage is output; setting a reference level required for the data when the data is outputted in accordance with the output configuration settings; determining whether or not a level of the data stored in the storage is lower than the reference level; generating a raised data of which level is increased to the reference level by increasing the level of the data stored in the storage when it is determined in the determining step that the level of the data stored in the storage is lower than the reference level; outputting the raised data generated in the generating step in accordance with the output configuration settings when it is determined in the determining step that the level of the data stored in the storage is lower than the reference level; and outputting the data stored in the storage in accordance with the output configuration settings when it is determined in the determining step that the level of the data stored in the storage is no lower than the reference level.

To solve the aforementioned problem, the present invention provides a computer-executable computer program stored thereon for causing a computer to execute the steps of: making output configuration settings applied when data stored in a storage is output; setting a reference level required for the data when the data is outputted in accordance with the output configuration settings; determining whether or not a level of the data stored in the storage is lower than the reference level; generating a raised data of which level is increased to the reference level by increasing the level of the data stored in the storage when it is determined in the determining step that the level of the data stored in the storage is lower than the reference level; outputting the raised data generated in the generating step in accordance with the output configuration settings when it is determined in the determining step that the level of the data stored in the storage is lower than the reference level; and outputting the data stored in the storage in accordance with the output configuration settings when it is determined in the determining step that the level of the data stored in the storage is no lower than the reference level.

According to the present invention of the above aspects, for example, when a file stored in a Box is output (i.e., printed or sent), in the various output configuration settings specified by a user, output quality can be maintained.

Further features of the present invention will become apparent from the following description of exemplary embodiments (with reference to the attached drawings).

BRIEF DESCRIPTION OF THE DRAWINGS

FIG. 7 is a diagram showing the relationship of FIGS. 7A and 7B;

FIG. 7A is an upper part of a flowchart of the process of printing Box data in embodiment 1;

FIG. 10 is a diagram showing the relationship of FIGS. 10A and 10B;

DETAILED DESCRIPTION OF THE EMBODIMENTS

Embodiment 1

The process of printing a document stored in the Box in an MFP (Multi Function Peripheral) which is a best mode for carrying out the present invention will be described below with reference to the accompanying drawings.

Figure 1:
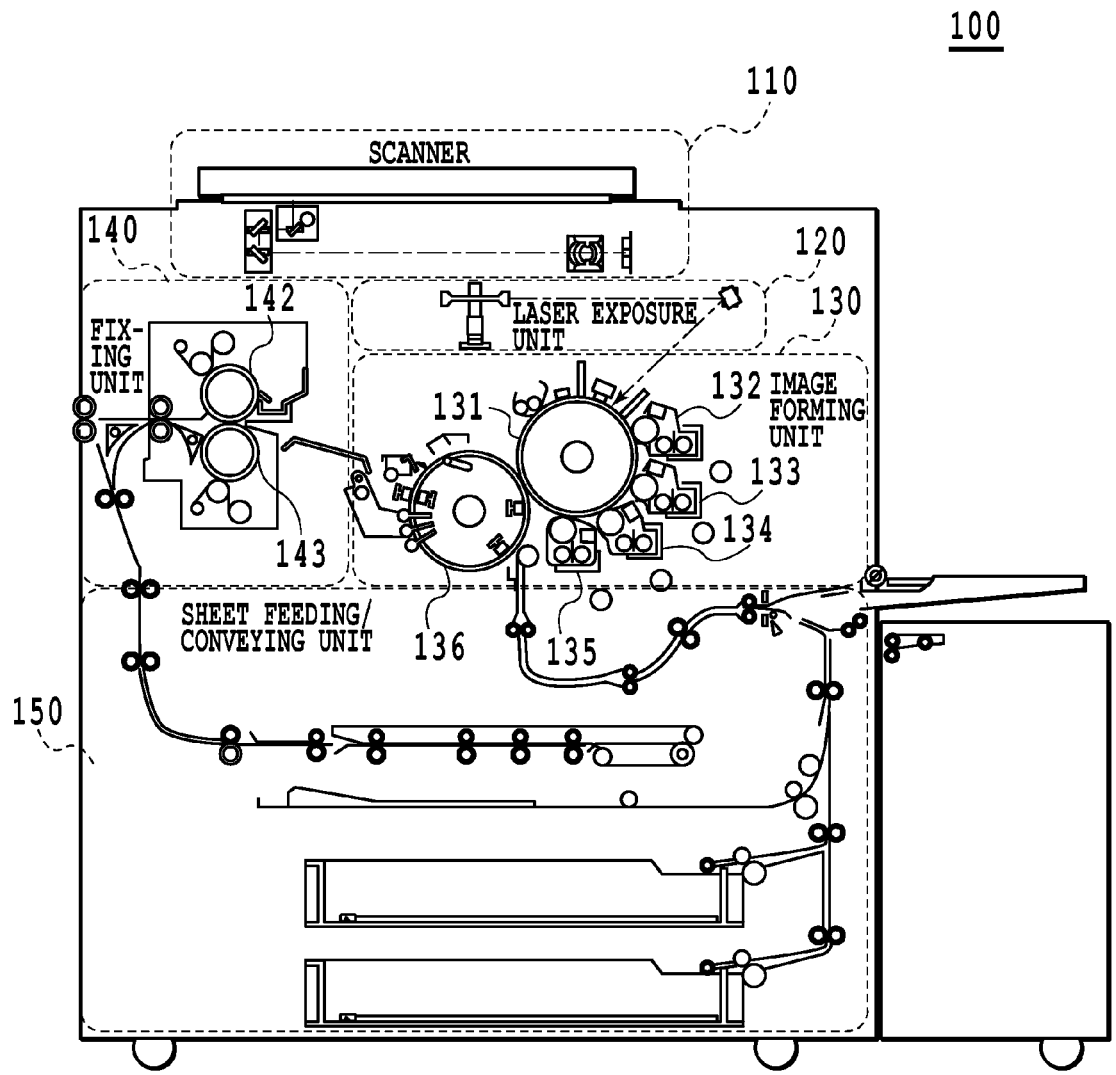
FIG. 1 is a side sectional view of the structure of a printer (MFP) which is an embodiment of an image processing apparatus according to the present invention.

With reference to FIG. 1 a description will be given of the structure of an ID color MFP suitable for the embodiment.

FIG. 1 illustrates a 1D color MFP 100 which comprises a scanner unit 110, a laser exposure unit 120, a photosensitive drum 131, an image forming unit 130, a fixing unit 140, a sheet feeding/conveying unit 150 and a printer controller (not shown) for controlling these units.

The scanner unit 110 illuminates an original document placed on the document glass to optically scan the document image, and converts the scanned image into electrical signals for the generation of image data.

The laser exposure unit 120 directs a light beam, such as laser light, which has been modulated in accordance with the image data, onto a polygonal mirror rotating at a constant angular velocity, so that the scan beam is reflected from the polygonal mirror and applied to the photosensitive drum 131.

The image forming unit 130 rotates the photosensitive drum 131, operates a charger to electrically charge the photosensitive drum 131, then uses toner to develop the latent image formed on the photosensitive drum 131 by the laser exposure unit 120, and then transfer the toner image to a sheet. The image forming unit 130 then collects the fine particles of the toner remaining on the photosensitive drum 131 after the transfer. The image forming unit 130 performs a series of such steps in the electro-photography process to form an image. At this stage, while the sheet is wound on a predetermined area of the transfer belt and rotated four times, developing units (developing stations) 132-135 respectively equipped with magenta (M), cyan (C), yellow (Y) and black (K) toners in turn repeat the electro-photography process. After the four rotations, the sheet on which the four-color toner image is transferred is conveyed from the transfer drum 136 to the fixing unit 140.

The fixing unit 140 comprises a combination of rollers 142, 143 and belts and a heat source such as a halogen heater which is built into the fixing unit 140. The fixing unit 140 uses heat and pressure to fuse and fix the toner on the sheet on which the toner image has been transferred by the image forming unit 130.

The sheet feeding/conveying unit 150 comprises one or more sheet trays such as typically a sheet cassette or a paper deck. The sheet feeding/conveying unit 150 separates a sheet from a plurality of sheets stacked on the sheet tray, and conveys it to the image forming unit 130/the fixing unit 140 in response to an instruction from the printer controller. The sheet is wound around a transfer drum of the image forming unit 130, then rotated four times and then conveyed to the fixing unit 140. During the four rotations, the toner image of each of the aforementioned YMCK colors is transferred to the sheet. When images are formed on the two sides of the sheet, the sheet, which has passed through the fixing unit 140, is controlled to be conveyed back to the image forming unit 130 through the conveyance path.

The printer controller communicates with an MFP control unit (not shown) which controls the entire MFP 100, and initiates the control in response to an instruction from the MFP control unit. The printer controller gives instructions while managing the states of to the scanner unit 110, the laser exposure unit 120, the image forming unit 130, the fixing unit 140, the sheet feeding/conveying unit 150, in order for all of them to smoothly operate in harmony with each other.

Figure 2:
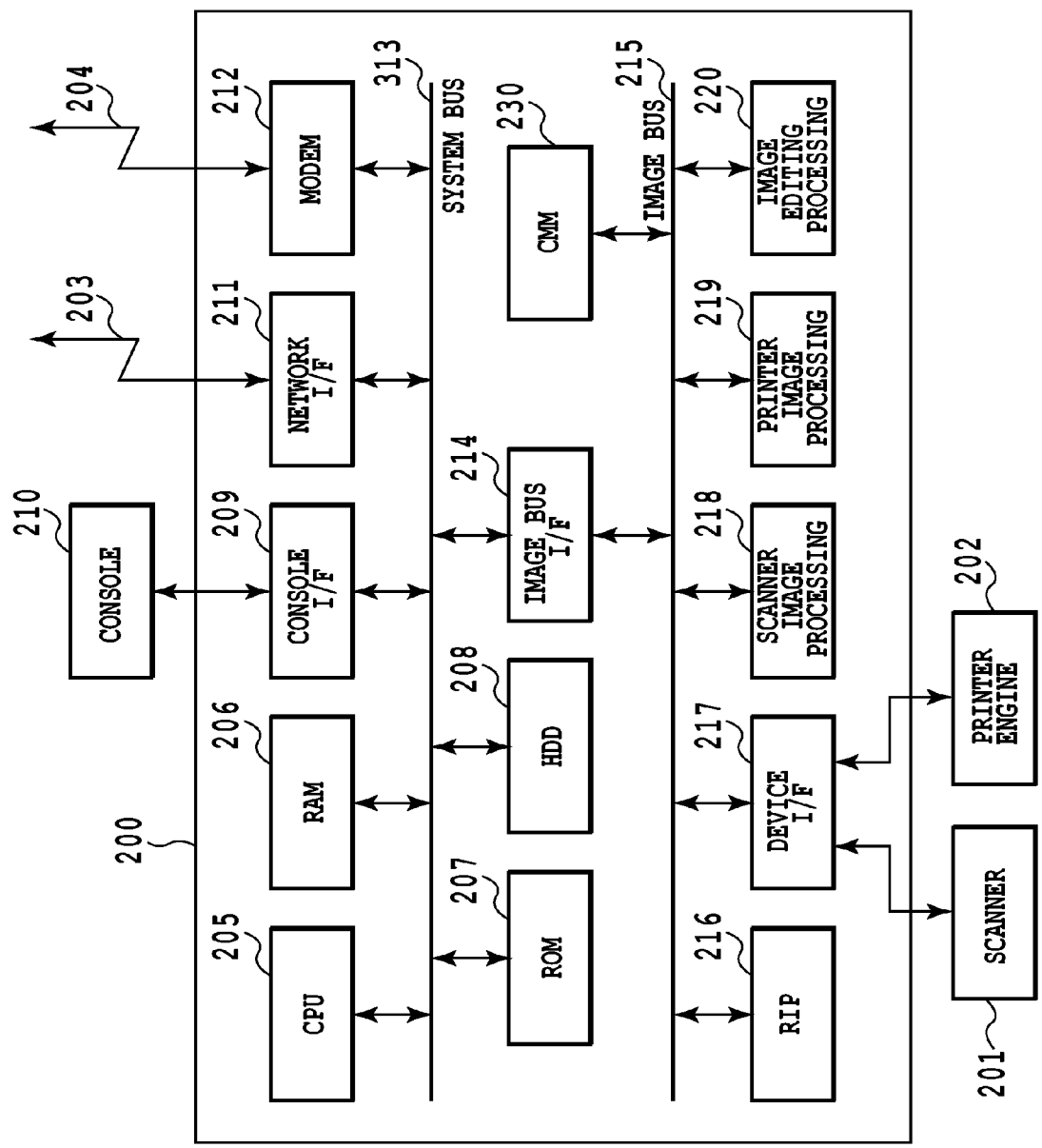
FIG. 2 is a block diagram showing an exemplary configuration of a control unit of the image processing apparatus in the embodiment.

FIG. 2 is a block diagram of an exemplary configuration of the control unit (controller) of the MFP according to the embodiment. In FIG. 2, the control unit 200 is connected to a scanner 201 which is an image input device and a printer engine 202 which is an image output device, and controls the scanning of image data and the printed output. The control unit 200 is connected to LAN 203 and a public line 204 for the control of input and output of image information and device information through the LAN 203.

A CPU 205 controls the entire MFP. A RAM 206 is a work memory used for the operation of the CPU 205, and serves as an image memory for temporarily storing input image data. A ROM 207 is a boot ROM, which stores a system boot program. An HDD 208 is a hard disk drive, which stores system software for various types of processing, input image data and the like. A console I/F 209 is an interface to a console 210 having a display screen capable of displaying image data or the like. The console I/F 209 outputs console screen data to the console 210. The console I/F 209 also has the function of passing user-entered information from the console 210 to the CPU 205. A network interface 211 is implemented by, for example, a LAN card, which is connected to the LAN 203 for input/output of information to/from external devices. In addition, a modem 212 is connected to the public line 204 for input/output of information to/from external devices. The above-described units are disposed on the system bus 213.

An image bus I/F 214 is an interface for connection between the system bus 213 and an image bus 215 which transfers image data at high speed, which serves as a bus bridge for conversion of data structure. To the image bus 215 are connected a raster image processor 216, a device I/F 217, a scanner image processing unit 218, a printer image processing unit 219, an image editing processing unit 220 and a color management module 230.

The raster image processor (RIP) 216 converts page description language (PDL) code or vector data, described later, into an image. The device I/F 217 connects the scanner 201 and the printer engine 202 to the control unit 200, for synchronous/asynchronous conversion of image data.

The scanner image processing unit 218 performs various processes for correction, manipulation, editing and the like on the image data supplied from the scanner 201. The printer image processing unit 219 performs various processes for correction, resolution conversion, and the like in accordance with the printer engine, on the image data to be printed. The image editing processing unit 220 performs image processing such as the rotation of image data and compression/expansion of image data. The CMM 230 is a hardware module designed for color conversion (also called "color space conversion") which is performed on image data on the basis of a profile or calibration data. A profile is information such as functions for conversion of color image data from a device-dependent color space to a device-independent color space (for example, Lab). Calibration data is for correction of the color reproduction characteristics of the scanner unit 201 or the printer engine 202 in the color multifunction peripheral.

Figure 3:
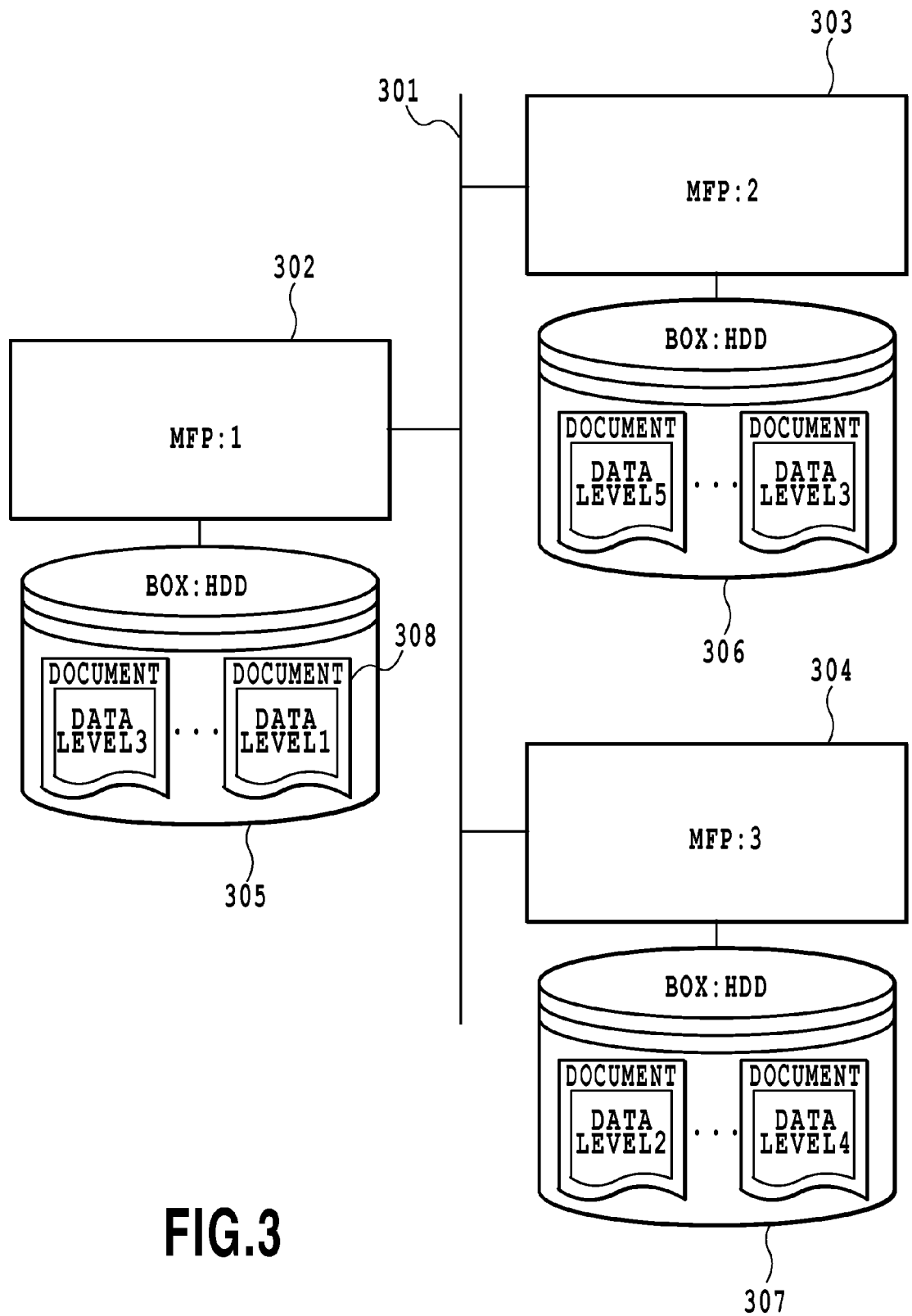
FIG. 3 is a diagram illustrating the application to a system comprising printers differing in hardware structure from the embodiment.

FIG. 3 is a block diagram showing the entire configuration of the image processing system including the image processing apparatus according to the embodiment. In FIG. 3, the image processing system comprises an MFP 1 designated by reference numeral 302, an MFP 2 designated by reference numeral 303 and an MFP 3 designated by reference numeral 304 which are connected to each other through LAN (Local Area Network) 301 and the like.

Each of the MFPs is equipped with an HDD (Hard Disk Drive) as a secondary storage unit. The HDD stores a Document as an object of a scan job, a copy job or a print job, thus making it possible to implement a BOX function for a fresh outputting/another output of the Document at another time after changing the job settings or the output manner. The MFPs comprise the respective HDDs 305, 306, 307 which are capable of storing Documents of various data formats or data levels. The MFP 1, the MFP 2 and the MFP 3 use network protocols to communicate with each other. These MFPs connected to each other through the LAN 301 need not be limited to a physical arrangement as described above. Devices (for example, a PC, various servers, a printer and the like), in addition to the MFPs, may be connected to the LAN 301. Each of the MFPs can execute the Box function on a Document other than the Document stored in its HDD. By means of the connection through the LAN 301, each of the MFPs can exercise a similar Box function on a Document stored in the HDD of another MFP connected thereto. In addition, each of the MFPs can operate the Box function for a Document stored in its HDD as a function for printing in or transmitting to another MFP connected thereto through the LAN 301.

Figure 4:
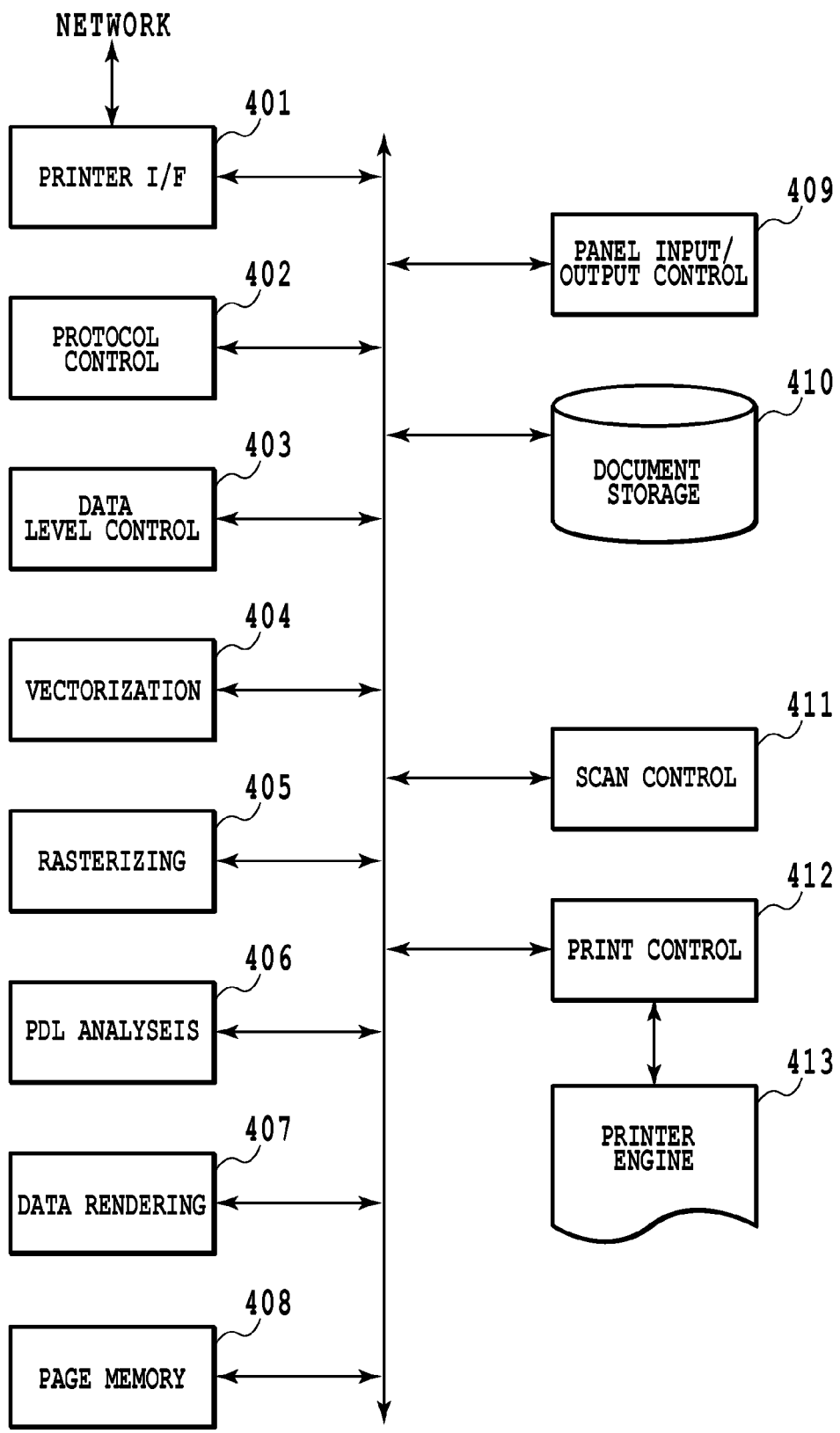
FIG. 4 is a block diagram showing an exemplary configuration of controller software in embodiment 1.

FIG. 4 is a block diagram showing the configuration of controller software controlling the operation of the MFP. A printer interface 401 allows the input/output between the MFP and external devices. A protocol control unit 402 analyzes and transmits a network protocol to conduct communications with external devices. A data level control unit 403 controls the data level of the data stored in a document storage unit 410 such that the data can be re-printed with sufficient accuracy to meet the requirements. A vectorization unit 404 vectorizes a bitmap image to generate resolution-independent vector data in rendering description. A rasterizing unit 405 rasterizes resolution-independent vector data in rendering description to generate a bitmap image. Rasterization is the inverse of vectorization. A PDL analysis unit 406 analyzes PDL (Page Description Language) and converts it to Display-List of intermediate code which is a format which facilitates processing and is suitable for the printing process of the MFP after the bitmap expansion. The intermediate code generated in the PDL analysis unit 406 is passed to a data rendering unit 407 for processing. The data rendering unit 407 expands the intermediate code to bitmap data which are then sequentially rendered into a page memory 408. The page memory 408, which is a volatile memory, temporarily holds the bitmap data rendered by the data rendering.

A panel input/output control unit 409 controls the input from and the output to the console. The document storage unit 410 stores various types of data format, data levels such as those of PDL and a bitmap image in units of input document groups (jobs), and is implemented by a secondary storage unit such as a hard disk. In the present specification the data file is referred to as "document".

A scan control unit 411 performs various processes for correction, manipulation, editing and the like on the image data supplied from the scanner 201. A print control unit 412 converts the contents of the page memory 407 into video signals for transfer the image to a printer engine 413. The printer engine 413 is a printing station for processing the video signal received from the print control unit 412 to form (print) an image on a sheet.

Figure 5:
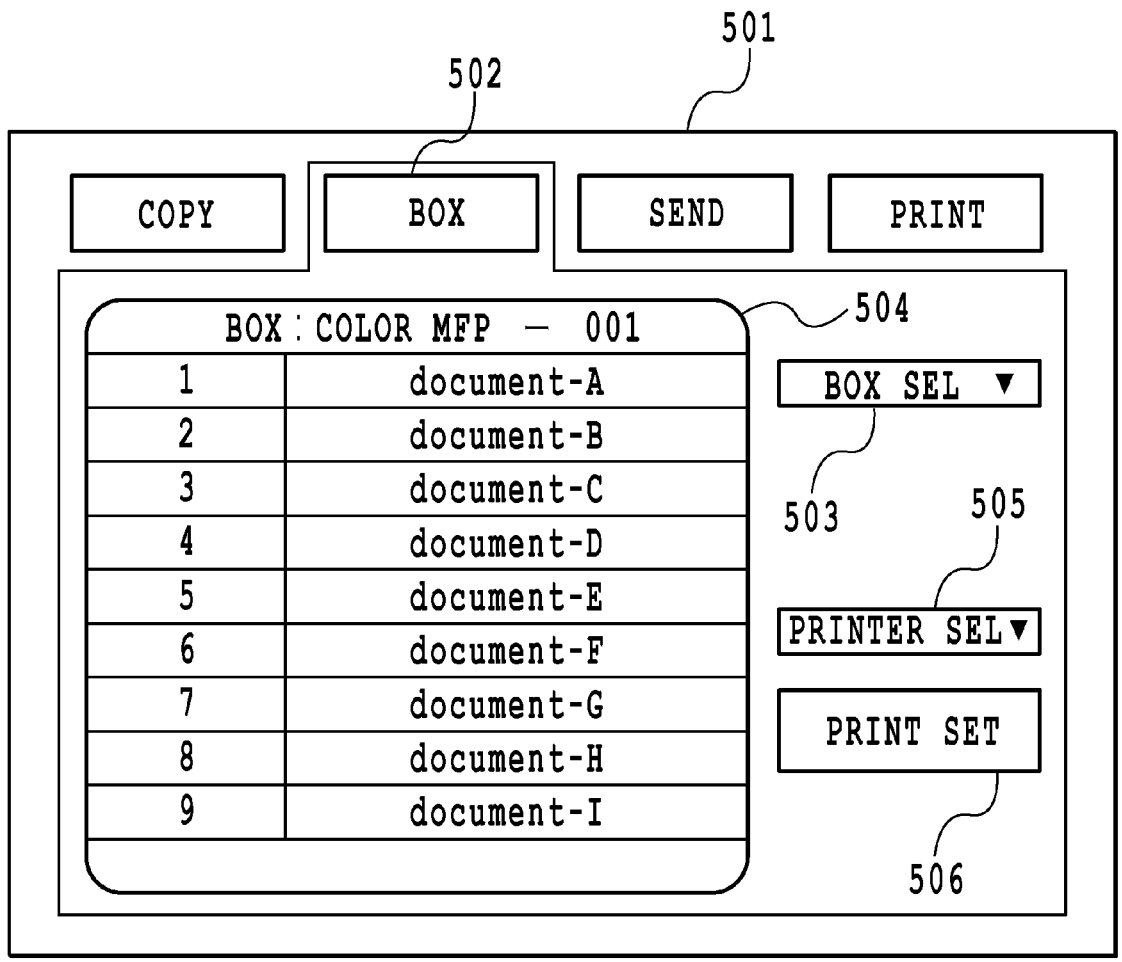
FIG. 5 is a diagram showing an example of a screen displayed on a console in embodiment 1.

FIG. 5 shows an example of the screen displayed on the display of the console of the local device when the operator selects and prints out a Document stored in the Box. The screen 501 for the Box setting and starting is displayed when the user (operator) presses a box mode button 502. Thereupon, a list (504) of document data (jobs) stored in a selected Box is displayed. The operator presses a box selection button 503, whereupon a pull-down list of available Boxes (not shown) is displayed. The operator can select a desired Box from the list. Upon selection of the Box from the pull-down list, a list of documents stored in the selected Box (504) is displayed. A box stored in another MFP which is connected thereto through LAN may be selected, such that the operator can read the data stored in the selected box of the other MFP. The list 504 shows the Box data of the selected MFP. Therefore, the operator can check the Box number and document names, and select a document to be printed from the Box. When the operator presses a printer selection button 505, a pull-down list (not shown) of MFPs on which the operator can print the document is displayed. The user can select a desired MFP from the displayed list. The list of the settable MFPs on which the operator can print the document is previously held in each MFP. Alternatively, the MFP may retrieve a list of settable MFPs from a configuration management server (not shown) managing the list and connected to the LAN. Further alternatively, for the list of settable MFPs, a packet searching for output devices which can honor a printing request may be broadcasted on the LAN and the output devices responding to the packet may be listed. A print setting (output setting) button 506 is for displaying the printed output setting screen (not shown) for configuring the settings when a selected document is printed on a selected printer (or another device). Settable items on the printed output setting screen will be described below with reference the following tables 1 and 2.

TABLE 1

| | BoxToPrint |
|---|---|
| Paper selection | APS |
| | APS, Automatic rotation |
| | ACC |
| | Manual feeding |
| | Free size manual feeding |
| Sorting | Sorting without finisher |
| | Group sorting without finisher |
| | Rotating sorting without finisher |
| | Rotating group without finisher |
| | Shift sorting with finisher |
| | Shift group with finisher |
| | Stapling sorting with finisher |
| | Punching with finisher |
| Sides | One side |
| | Two sides |
| | Individual two sided copy from each document |
| | Continuous two sided copy from documents |
| Cover/flyleaf | Cover |
| | Flyleaf (no printing) |
| Binding | Binding |
| | Stapling of pages |
| | Cover (no printing) |
| | Test printing |
| Size mixture | Mixture of size of original (same paper series) |
| | Mixture of size of original (different paper series) |
| Types of printing | Printing of one document |
| | Printing of multiple documents |
| | Printing in combination job |
| | Number of copies |

Table 1 shows an example of settable print items in the embodiment, and is a list of settable print items when data stored in the Box is printed or sent. "Sheet selection" is the item for selecting a sheet for printed output, in which a list of paper sizes which can be selected for printed output. "Sorting" specifies the order of sheets to be printed, including the presence/absence of finisher settings. "Sides" is for the settings of printing on either one side or two sides of the output sheet, and the like. "Cover/flyleaf" is for the settings of the insertion of the cover of a flyleaf, and the like. "Size mixture" can conduct the settings of making the determination whether or not the correction of the direction of output conveyance and the like are made when the input data differs in paper size from each other. "Types of printing" makes it possible to perform job manipulation of selecting and combining a plurality of documents stored in the Box. If any function, except for the functions shown in Table 1, is not used, the process of scaling (enlargement/reduction) is not required to be performed on data stored in the Box. Accordingly, only the purpose of configuring the settings relating to the functions shown in Table 1, the data level of the stored data is not required to be changed by use of the vectorization unit and the rasterizing unit shown in FIG. 4. As a result, the printed output can be achieved without the data-level control.

TABLE 2

| | BoxToPrint |
|---|---|
| Scaling | Fixed scaling |
| | XY zooming |
| | independent X, Y zooming |
| | Automatic scaling |
| | Zoom program |
| Reduction layout | 2 in 1 |
| | 4 in 1 |
| | 8 in 1 |

TABLE 2-continued

| | BoxToPrint |
|---|---|
| Frame erase | Original frame erase |
| | Book frame erase |
| | Punching frame erase |
| Image processing | Sharpness |
| | Resolution conversion |
| | Monochrome to color conversion |
| | Negative/positive inverse |
| Document editing | Name of scanned document |
| | Editing of object in document |

Table 2 shows an example of items of advanced print settings in the embodiment, and is a list of settable print items when data stored in the Box is printed or sent. "Scaling" specifies a scaling factor of enlargement or reduction used for a document stored in the Box. "Reduction layout" pastes pages of documents stored in the Box onto a plurality of sheets of paper, in which the pages of the documents are reduced in size and output. When a frame is drawn on a page of a document stored in the Box, "frame erase" specifies erasure of the frame for output. "Image processing" means that the image processing is performed on a document stored in the Box, and the resolution conversion is a process corresponding to enlargement/reduction. "Document editing" is the function of editing a document name of or a draw object in a document stored in the Box. The functions shown in Table 2 perform the process of scaling (enlargement/reduction) on data stored in the Box. Accordingly, for maintaining a sufficient output quality of an image, the data level of the stored data is required to be changed to a sufficient level required for the scaling by use of the vectorization unit 404 and the rasterizing unit 405. For this purpose, the level of data is controlled by the data level control unit 403.

Figure 6:
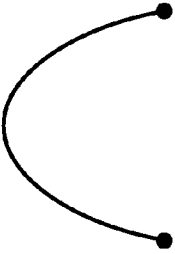
FIG. 6 is a correlation diagram of an output data format in the embodiment.
Figure 6:
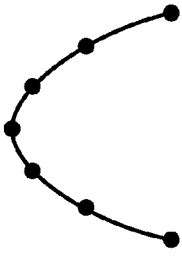
Figure 6:
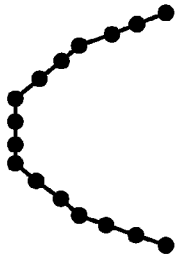
Figure 6:
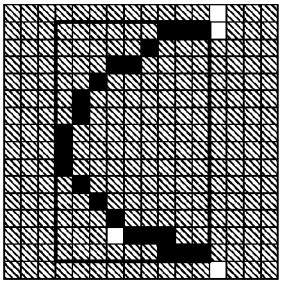
Figure 6:
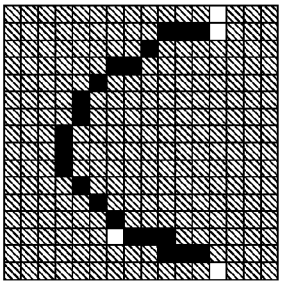

FIG. 6 is a correlation diagram of a data level in data stored in the Box, a function set for output, and a suitable data format. The level of data initially stored in the Box depends on how the data has been stored (for example, the data is scan data stored in the scanning process or is PDL data received from a computer in the printing process), so that the data has various level. In the embodiment, the data levels are classified into five levels.

Level 1 corresponds to data levels of scan data stored in the Box, PDL data rasterized and then stored, and the like. The data of level 1 is bitmap image data. When the image processing without scaling is specified in the output settings, a sufficient output quality is fulfilled in level 1.

Level 2 corresponds to a data level of scan data stored in the Box after subjected to OCR (Optical Character Recognition) process. In the data of level 2, a character string which is the OCR results is added to the bitmap data as additional information on a character block. When a searchable PDF (Portable Document Format) is generated in the output settings, a sufficient output quality is fulfilled in level 2. The searchable PDF is a PDF file in which search transparent text which is created from the OCR results overlays a corresponding character image on the scan image and then preserved.

Level 3 corresponds to a level of data on objects each represented by a point sequence which has been obtained by detecting a contour of the object from data obtained by rendering scan data or PDL data (that is, an bitmap image) and then collinearly approximating the contour. When the point sequence data as a result of vectorization by such collinear approximation is stored in the Box, the data has level 3. That is, the data of level 3 is an information set obtained by connecting the points with line segments. When the process of editing an object and/or erasing a frame, in which large scaling is not required, is selected in the output settings, a sufficient output quality is fulfilled in level 3.

Level 4 corresponds to a data level when the point sequence data in level 3 is approximated with Bezier curves on short-section to short-section basis (for example, on five-point to five-point basis). Accordingly, the data of level 4 is represented by Bezier curve set. When the process of reduction layout or a certain degree of scaling is selected in the output settings, a sufficient output quality is fulfilled in level 4.

Level 5 is a data level when Bezier curve set data of level 4 are combined, approximated and then converted into a smoother Bezier curve (higher quality Bezier curve). The data of level 5 is vector data represented by the Bezier curve. When scalable PDF output is selected in the output settings, a sufficient output quality is fulfilled in level 5. The scalable PDF is PDF data including vector data, and is defined as data capable of surviving various processes for a reuse at another time in units of objects, a large change in scale, and the like in the embodiment.

Figure 7B:
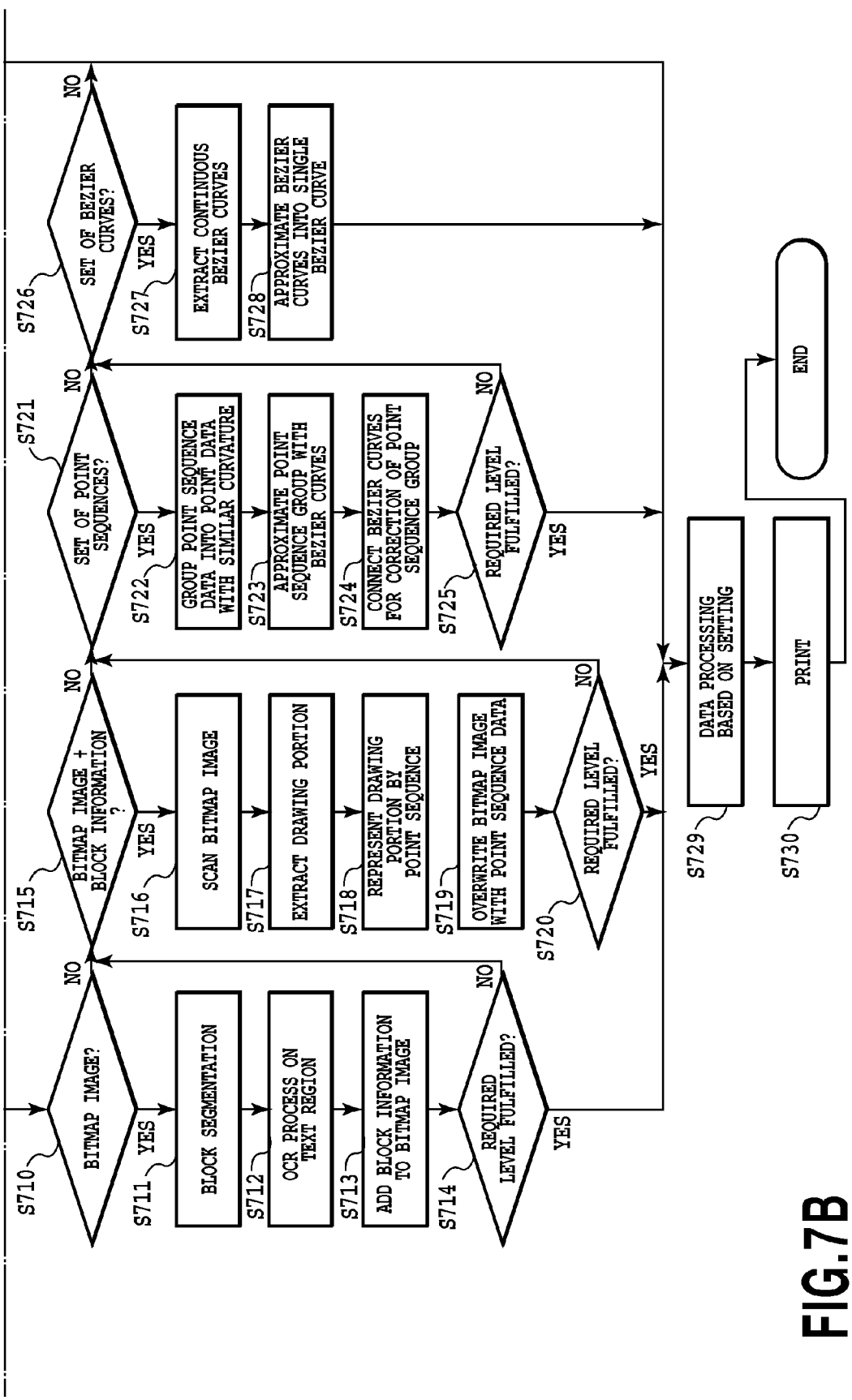
FIG. 7B is a lower part of the flowchart of the process of printing Box data in embodiment 1.

FIG. 7A and FIG. 7B are flowcharts of the processing of printing data in the Box according to the embodiment. The flowcharts correspond to the process of printing data stored in the Box which is executed from the MFP console screen. This is performed by the CPU 205 of the control unit 200 of the MFP in FIG. 2 or by any element in the control unit 200 under the control of the CPU 205.

In step S701 in FIG. 7A, a box in which a document to be printed is stored (the user desired MFP Box) is selected on the basis of the instruction from the user. A target MFP can be selected from a plurality of MFPs by means of a network connection or the like. Then, in step S702, based on the user's instructions, a Box number and a document are selected from the selected Box to decide the document to be printed. Then, in step S703, based on the user's instructions, a printer on which the document is to be printed is selected. Then, in step S704, based on the user's instructions, print output settings are configured.

Then, in step S705, the data level of the document to be output which is stored in the Box is obtained in the MFP controller. Then, in step S706, it is determined whether or not the data level obtained in step S705 is the maximum level. If it is the maximum level, the procedure goes to step S729 to start data processing based on the print settings. If the data level is not the maximum level, the procedure goes to step S707 to obtain the print setting information set in step S704 in the MFP controller. Then, in step S708, a data level required to maintain the output quality when an output is produced in the specified print settings is set or defined as a parameter (a minimum reference level). i.e. A minimum reference level is determined based on the specified print setting.

Then, in step S709, it is determined whether or not the data level of the data stored in the Box at present is higher than the data level required in the specified print settings. The determination is made by comparing the data level of the data stored in the Box obtained in step S705 with the parameter of the data level required for output set in step S708. If the determination is made that the data level is sufficiently high (that is, if the level of the stored data is higher than the reference data level required for output), the procedure goes to step S729 to start the data processing based on the configured output settings.

On the other hand, if the determination is made in step S709 that the data level is insufficient (lower than the reference level), the procedure goes to step S710 to determine whether or not the document data to be output which is stored in the Box is a bitmap image (whether or not the data level is level 1). If it is not a bitmap image (level 1), the procedure goes to step S715. If the determination is made that the data is a bitmap image, the procedure goes to step S711 in FIG. 7B to segment the bitmap image into blocks (regions). Then, in step S712, a region classified as the text region through the block segmentation is subjected to OCR processing to extract a character string. Then, in step S713, the extracted block information (the character string of the OCR results, positional information on the character region including each OCR result) is added to the bitmap image. At this stage, the data level becomes level 2 (character code of characters included in the bitmap+character region). Then, in step S714, it is determined whether or not the data level (level 2) at this moment fulfills the data level required for output which is set in S708. If the determination is made in step S714 that the data level is fulfilled, the procedure goes to step S729 to start the data processing based on the print output settings. When the determination is made in step S714 that the data level is fulfilled, the data generated after the processing in S713 is desirably replaced by the data stored in the Box for preservation. In this manner, when the data is output again in another time, the process of increasing the level of the data can be omitted.

On the other hand, if the determination is made in step S714 that the data level is not fulfilled, the procedure goes to step S715 in FIG. 7A to determine whether or not the stored data is a bitmap image and block information (in level 2). If the data is not a bitmap image and block information, the procedure goes to step S721. If the data includes a bitmap image and block information (is in level 2), the procedure goes to step S716 in FIG. 7B. In step S716, the bitmap image is scanned in order to detect an object (drawing portion) included in the bitmap image. For example, the contour detection process is performed to detect the contour of the drawing portion included in the bitmap image. Then, in step S717, the detected contour of the drawing portion is extracted. In the embodiment, the contour of each of the objects included in a graphic region such as line art, a chart region such as table ruled lines, a character region and/or the like is extracted. Then, in step S718, the extracted drawing portion is expressed by a point sequence. In this stage, a rough contour of the drawing portion is linearly approximated and points indicating end points of each line segment are obtained as point sequence data. Then, in step S719, the bitmap image is overwritten with the point sequence data. In this connection, when a photograph region, such as a photograph or a natural image, is converted into point sequence data (vector), the amount of data is significantly increased. For this reason, the photograph region portion is preferably stored as JPEG data (alternatively bitmap data). At this point of time, the data level becomes level 3 (point-sequence vector data as a result of performing the vectorization using linear approximation). Then, in step S720, it is determined whether or not the data level at this moment (level 3) fulfills the data level required for output set in S708. If it does, the procedure goes to step S729 to start the data processing based on the print output setting. When it is determined in step S720 that the data level is fulfilled, the data generated after the processing in S719 is desirably replaced by the data stored in the Box for preservation.

On the other hand, if the determination is made in step S720 that the data level is not fulfilled, the procedure goes to step S721 in FIG. 7A. It is determined in step S721 whether or not the stored data is a set of point sequences (is in level 3). If the data is not a set of point sequences, the procedure goes to step S726. If the data is a set of point sequences (is in level 3), the procedure goes to step S722 in FIG. 7B. In step S722, the point sequence data is grouped into point data which are similar in curvature on a predetermined section basis. Then, the procedure goes to step S723 to approximate the point sequence groups by Bezier curves. Then, the procedure goes to step S724, in which a correction is made such that the Bezier curves of the adjacent point-sequence groups are connected to each other, resulting in Bezier curve representation for each section. In this point of time, the data level reaches level 4 (vector data which is approximated by Bezier curve on a short section basis). Then, the procedure goes to step S725 to determine whether or not the data level at this moment (level 4) fulfills the data level required for output set in S708. If it does, the procedure goes to step S729 to start the data processing based on the print output setting. When it is determined in step S725 that the data level is fulfilled, the data generated after the processing in S724 is desirably replaced by the data stored in the Box for preservation.

On the other hand, if the determination is made in step S725 that the data level is not fulfilled, the procedure goes to step S726 in FIG. 7A. It is determined in step S726 whether or not the stored data is a set of Bezier curves (is in level 4). If the data is not a set of Bezier curves, the procedure goes to step S729. If the data is a set of Bezier curves (is in level 4), the procedure goes to step S727 in FIG. 7B. In step S727, the Bezier curves continuously connected to each other are extracted from the set of Bezier curves. Then, the procedure goes to step S728 to approximate a plurality of Bezier curves connected to each other into a single Bezier curve for representation. In this point of time, the data level reaches level 5 (vector data which is represented by the more smoothly approximated Bezier curve). The data generated after the processing in S728 is desirably replaced by the data stored in the Box for preservation in order to prevent the data conversion process from being repeatedly performed for printed output in another time. Then, the procedure goes to step S729 to start the data processing based on the print setting. The data processed in step S729 is printed in step S730, thus terminating a series of processes.

In this manner, when the level of the stored data is low, the data level is gradually raised. Then, the data conversion processing is terminated for printed output at the time when it is determined that the data level is raised to a level sufficiently meeting the requirements for maintaining the output quality when the print is output in the specified print setting. In other words, the data conversion (the data generation process for raising the data level (the approximation process and the like)) is not performed unnecessarily, resulting in the speeding up of conversion processing.

Embodiment 2

Transmission processing for electronic document data stored in a Box of an MFP according to a best mode for carrying out the present invention will be described below with reference to the drawings.

Figure 8:
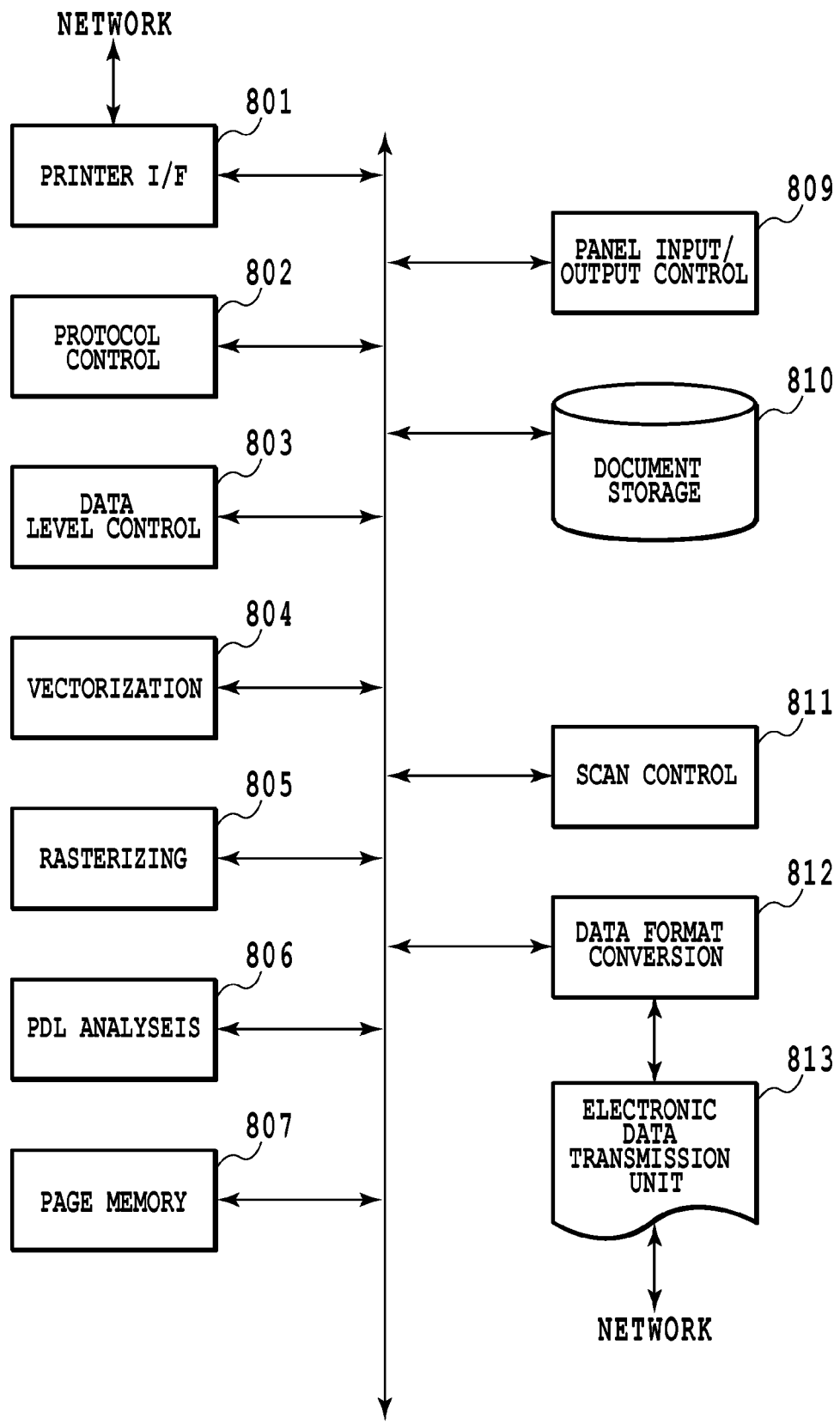
FIG. 8 is a block diagram showing an exemplary configuration of controller software in embodiment 2.

FIG. 8 is a block diagram showing the configuration of controller software controlling the operation of the MFP. A printer interface 801 allows the input/output between the MFP and external devices. A protocol control unit 802 analyzes and transmits a network protocol to conduct communications with external devices. A data level control unit 803 controls the data level of the data stored in a document storage unit 810 until the data level become commensurate with a function sufficiently meeting the requirements when the print is repeatedly output. A vectorization unit 804 vectorizes a bitmap image to generate resolution-independent vector data in rendering description. A rasterizing unit 805 rasterizes resolution-independent vector data in rendering description to generate a bitmap image. Rasterization is the inverse of vectorization. A PDL analysis unit 806 analyzes PDL (Page Description Language). The results generated in the PDL analysis unit 806 is stored in a page memory 807, and then notified to a data format conversion unit 812. The data format conversion unit 812 converts the results into an arbitrary electronic data which is then transferred to an electronic data transmission unit 813. The electronic data transmission unit 813 transmits the received electronic data to a specified external protocol through a network.

Figure 9:
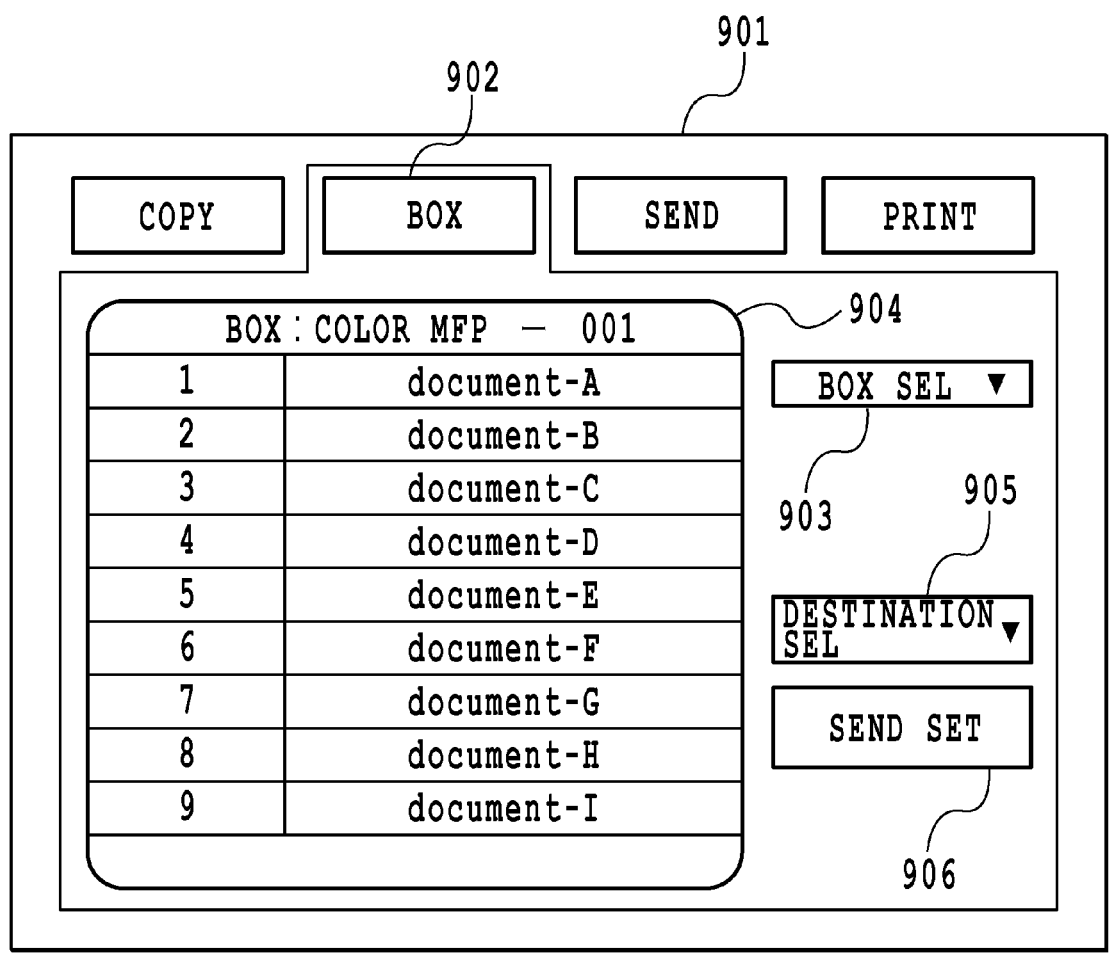
FIG. 9 is a diagram showing an example of a screen displayed on a console in embodiment 2.

FIG. 9 shows an example of the screen displayed on the display of the console of a local device when the operator selects a document stored in the Box and transmits it as electronic data. The screen 901 for the Box setting and starting is displayed when the user (operator) presses a box mode button 902. Thereupon, a list (904) of document data (jobs) stored in a selected Box is displayed. The operator presses a box selection button 903, whereupon a pull-down list of available Boxes (not shown) is displayed. The operator can select a desired Box from the list. Upon selection of the Box from the pull-down list, a list of documents stored in the selected Box (904) is displayed. A box in another MFP which is connected thereto through LAN may be selected, such that the operator can read the data stored in the selected box of the other MFP. The list 904 shows the Box data of the selected MFP. Therefore, the operator can check the Box number and document names, and select a document to be printed from the Box. When the operator presses a destination selection button 905, a pull-down list (not shown) of settable destinations is displayed so as to enable the user to select a desired destination from the displayed list. The list of the settable destinations is previously held in each MFP. Alternatively, the MFP may retrieve a list of settable destinations from a configuration management server (not shown) managing the list and connected to the LAN. Further alternatively, a packet searching for devices connected to LAN may be broadcasted and the devices responding to the packet may be listed. Also, a new destination can be registered. A SEND setting (output setting) button 906 is for displaying the SEND setting screen (not shown) for configuring the settings when a selected document is output to a selected destination. Settable items on the SEND setting screen will be described below using the following tables 3 and 4.

TABLE 3

| BoxToSend | |
|---|---|
| Output format | TIFE (single page/multi-pages) |
|  | PDF (single page/multi-pages) |
| Image mode | Characters |
|  | Characters/photograph |
|  | Photograph |
| Extra function | Encrypted PDF generation function |
|  | Searchable PDF generation function (OCR) |
|  | Device signature PDF generation function |
|  | User signature PDF generation function |
|  | Time stamp PDF generation function |

Table 3 shows an example of settable transmission items in the embodiment, in which the settable SEND items in the transmission of data stored in a Box are listed. "Output format" designates format of electronic data to be transmitted. "Image mode" is for selecting preferential attributes of image quality in the image processing. "Extra function" means additional functions added to electronic data to be generated. "Extra function" includes, for example, a searchable PDF generation function for designating the generation of electronic data in which OCR results are embedded so as to make word search possible. If any function, except for the functions shown in Table 3 is not used, the electronic data to be generated is not required to be vector data (scalable data) which is suitable for scaling (enlargement/reduction). Accordingly, the printed output can be achieved without generating vector data from the stored data by use of the vectorization unit 804 and the rasterizing unit 805 shown in FIG. 8.

TABLE 4

| Extra function | Scalable PDF generation function |
|---|---|
|  | Scalable & searchable PDF function (PDL) |

Table 4 shows an example of items of advanced transmission settings in the embodiment, in which the settable SEND items in the transmission of data stored in a Box are listed. "Extra function" means additional functions added to electronic data to be generated. "Extra function" includes, for example, a resolution-independent searchable PDF generation function for reducing the degradation in image quality when the image is enlarged/reduced. The scalable PDF is data representing an object by use of vector data, which therefore is suitable for an editing process in which the object is reused because the image quality suffers little degradation even if the scaling is performed on the image in the destination. In addition, there is a function for generating scalable and searchable PDF in which word search data for making searching by a character string possible is added to scalable data (including vector data representing an object). When such data is generated, for maintaining sufficient output quality, the data level of the stored data is required to be changed to a required level by use of the vectorization unit 804 and the rasterizing unit 805. For this purpose, the data level is controlled by the data level control unit 803.

Figure 10A:
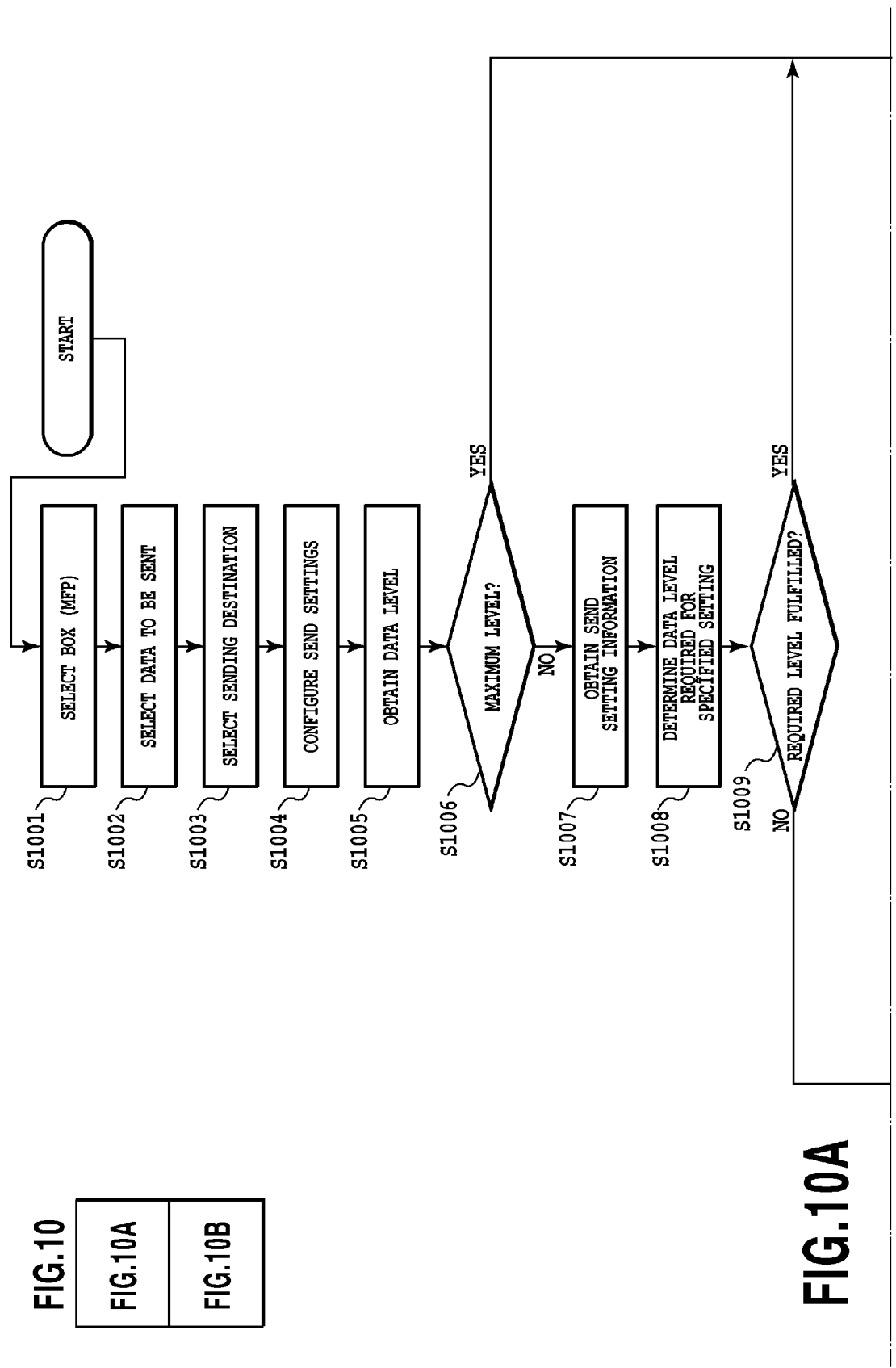
FIG. 10A is an upper part of a flowchart of the process of printing Box data in embodiment 2.
Figure 10B:
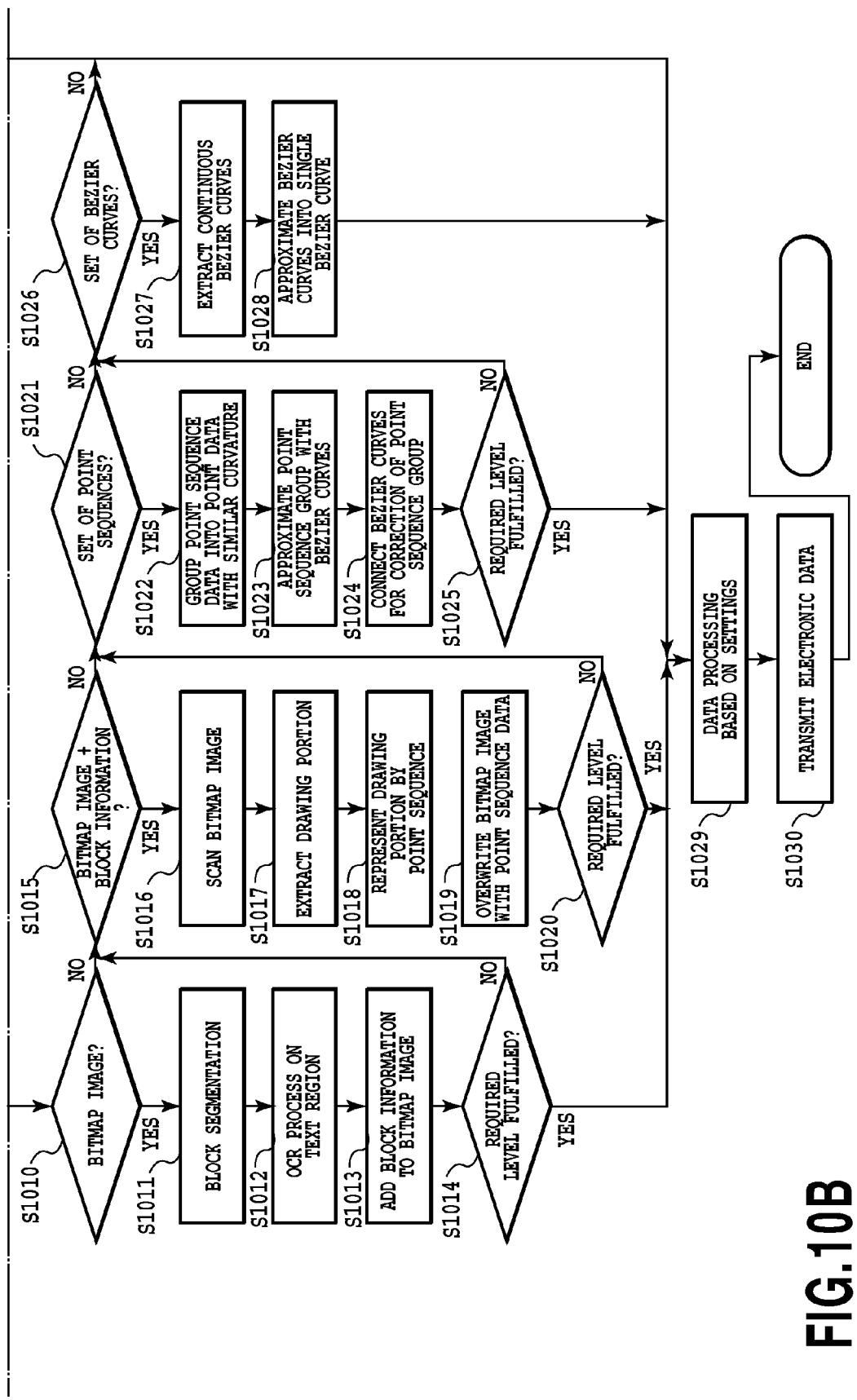
FIG. 10B is a lower part of the flowchart of the process of printing Box data in embodiment 2.

FIG. 10A and FIG. 10B are flowcharts of the processing of executing transmission of data stored in the Box according to the embodiment. The flowcharts correspond to the process of sending data stored in the Box which is executed from the MFP console screen. This is performed by the CPU 205 of the control unit 200 of the MFP in FIG. 2 or by any element in the control unit 200 under the control of the CPU 205.

In step S1001 in FIG. 10A, a box in which a document data to be sent is stored (the user desired MFP Box) is selected on the basis of the user's instruction. A target MFP can be selected from a plurality of MFPs by means of a network connection or the like. Then, in step S1002, based on the user's instructions, a Box number and a document are selected from the selected Box to decide the document to be sent. Then, in step S1003, based on the user's instructions, a destination device is selected. Then, in step S1004, based on the user's instructions, transmission (SEND) settings are configured.

Then, in step S1005, the data level of the document to be output which is stored in the Box is obtained in the MFP controller. Then, in step S1006, it is determined whether or not the data level obtained in step S1005 is the maximum level. If it is the maximum level, the procedure goes to step S1029 to start data processing based on the transmission (SEND) settings. If the data level is not the maximum level, the procedure goes to step S1007 to obtain the transmission (SEND) setting information established in step S1004 in the MFP controller. Then, in step S1008, a data level (a minimum reference level) required to maintain the output quality when an output is produced in the specified transmission (SEBD) settings is defined or set as a parameter.

Then, in step S1009, it is determined whether or not the data level of the data stored in the Box at present is higher than the data level required in the specified transmission (SEND) settings. The determination is made by comparing the data level of the data stored in the Box obtained in step S1005 with the parameter of the data level required for output set in step S1008. If the determination is made that the data level is sufficiently high (that is, if the level of the stored data is higher than the reference data level required for output), the procedure goes to step S1029 to start the data processing based on the transmission (SEND) settings.

On the other hand, if the determination is made in step S1009 that the data level is insufficient, the procedure goes to step S1010 to determine whether or not the document data to be output which is stored in the Box is a bitmap image (whether or not the data level is level 1). If it is not a bitmap image (level 1), the procedure goes to step S1015. If the determination is made that the data is a bitmap image, the procedure goes to step S1011 in FIG. 10B to segment the bitmap image into blocks (regions). Then, in step S1012, a region classified as the text region through the block segmentation is subjected to OCR processing to extract a character string. Then, in step S1013, the extracted block information (the character string of the OCR results, positional information on the character region including each OCR result) is added to the bitmap image. At this stage, the data level becomes level 2 (character code of characters included in the bitmap+character region). Then, in step S1014, it is determined whether or not the data level (level 2) at this moment fulfills the data level required for output which is set in S1008. If the determination is made in step S1014 that the data level is fulfilled, the procedure goes to step S1029 to start the data processing based on the transmission (SEND) output settings. When the determination is made in step S1014 that the data level is fulfilled, the data generated after the processing in S1013 is desirably replaced by the data stored in the Box for preservation. In this manner, when the data is output again in another time, the process of increasing the level of the data can be omitted.

On the other hand, if the determination is made in step S1014 that the data level is not fulfilled, the procedure goes to step S1015 in FIG. 10A to determine whether or not the stored data is a bitmap image and block information (in level 2). If the data are not a bitmap image and block information, the procedure goes to step S1021. If the data are a bitmap image and block information (is in level 2), the procedure goes to step S1016 in FIG. 10B. In step S1016, the bitmap image is scanned in order to detect an object (drawing portion) included in the bitmap image. For example, the contour detection process is performed to detect the contour of the drawing portion included in the bitmap image. Then, in step S1017, the detected contour of the drawing portion is extracted. In the embodiment, the contour of each of the objects included in a graphic region such as line art, a chart region such as table ruled lines, a character region and/or the like is extracted. Then, in step S1018, the extracted drawing portion is expressed by a point sequence. In this stage, a rough contour of the drawing portion is linearly approximated and points indicating end points of each line segment are obtained as point sequence data. Then, in step S1019, the bitmap image is overwritten with the point sequence data. In this connection, when a photograph region, such as a photograph or a natural image, is converted into point sequence data (vector), the amount of data is significantly increased. For this reason, the photograph region portion is preferably stored as JPEG data (alternatively bitmap data). At this point of time, the data level becomes level 3 (point-sequence vector data as a result of performing the vectorization using linear approximation). Then, in step S1020, it is determined whether or not the data level at this moment (level 3) fulfills the data level required for output set in S1008. If it does, the procedure goes to step S1029 to start the data processing based on the transmission (SEND) setting. When it is determined in step S1020 that the data level is fulfilled, the data generated after the processing in S1019 is desirably replaced by the data stored in the Box for preservation.

On the other hand, if the determination is made in step S1020 that the data level is not fulfilled, the procedure goes to step S1021 in FIG. 10A. It is determined in step S1021 whether or not the stored data is a set of point sequences (is in level 3). If the data is not a set of point sequences, the procedure goes to step S1026. If the data is a set of point sequences (is in level 3), the procedure goes to step S1022 in FIG. 10B. In step S1022, the point sequence data is grouped into point data which are similar in curvature on a predetermined section basis. Then, the procedure goes to step S1023 to approximate the point sequence groups by Bezier curves. Then, the procedure goes to step S1024, in which a correction is made such that the Bezier curves of the adjacent point-sequence groups are connected to each other, resulting in Bezier curve representation for each section. In this point of time, the data level reaches level 4 (vector data which is approximated by Bezier curve on a short section basis). Then, the procedure goes to step S1025 to determine whether or not the data level at this moment (level 4) fulfills the data level required for output set in S1008. If it does, the procedure goes to step S1029 to start the data processing based on the transmission (SEND) setting. When it is determined step S1025 that the data level is fulfilled, the data generated after the processing in S1024 is desirably replaced by the data stored in the Box for preservation.

On the other hand, if the determination is made in step S1025 that the data level is not fulfilled, the procedure goes to step S1026 in FIG. 10A. It is determined in step S1026 whether or not the stored data is a set of Bezier curves (is in level 4). If the data is not a set of Bezier curves, the procedure goes to step S1029. If the data is a set of Bezier curves (is in level 4), the procedure goes to step S1027 in FIG. 10B. In step S1027, the Bezier curves continuously connected to each other are extracted from the set of Bezier curves. Then, the procedure goes to step S1028 to approximate a plurality of Bezier curves connected to each other into a single Bezier curve for representation. In this point of time, the data level reaches level 5 (vector data which is represented by the more smoothly approximated Bezier curve). The data generated after the processing in S1028 is desirably replaced by the data stored in the Box for preservation in order to prevent the data conversion from being repeatedly performed for printed output in another time. Then, the procedure goes to step S1029 to start the data processing based on the transmission (SEND) setting. The data processed in step S1029 is sent in step S1030, thus terminating a series of processes.

In this manner, when the level of the stored data is low, the data level is gradually raised. Then, the data conversion processing is terminated for printed output at the time when it is determined that the data level reaches a level sufficiently meeting the requirements for maintaining the output quality when the print is output in the specified transmission setting. In other words, the data conversion (the process for raising the data level (the approximation process and the like)) is not performed unnecessarily, resulting in the speeding up of conversion processing.

Other Embodiments

The print output processing and the transmission output processing described in embodiment 1 and embodiment 2 may be switched for operation by user's instruction. For example, the print setting button 506 and the printer selection button 505 described in FIG. 5 and the transmission setting button 906 and the destination selection button 905 description FIG. 9 may be simultaneously displayed (or displayed by switching between them).

The foregoing embodiments employs Bezier curve in the approximation, but the approximation method is not so limited. Another curve approximation method may be employed.

As described above, the present invention may be applied either to a system comprising a plurality of devices (for example, a host computer, an interface device, a reader, a printer and the like) or to a single device (for example, a copier, a facsimile or the like).

Program codes of software for implementing the functions described in the aforementioned embodiments may be contained in a computer provided in an apparatus or a system which is connected to various devices to operate the various devices in such a manner as to implement the functions of the aforementioned embodiments, such that the various device can be operated in conformance with the program stored in the computer (CPU or MPU) of the system or the apparatus. This design is included in the scope of the present invention.

In this case, the program code of the software (computer-executable computer program) itself implements the aforementioned functions of the embodiments. Accordingly, the program code itself, and means for supplying the program code to a computer, for example, a computer-readable recording medium storing the program code, are included in the present invention.

Examples used as the recording medium storing the program code include a floppy (trademark) disk, a hard disk, an optical disk, a magnet-optical disk, CD-ROM, a magnetic tape, a nonvolatile memory card, and ROM.

Not only when the functions of the aforementioned embodiments are implemented by executing the program code contained in the computer, but also when the program code implements the functions of the aforementioned embodiments in association with OS (Operating System), another application software or the like which runs in the computer, it goes without saying that such program code is included in the embodiments of the present invention.

The program code supplied may be stored in a memory provided on a feature expansion board of the computer or a feature expansion unit connected to the computer. Then, on the basis of the instructions of the program code, CPU or the like mounted on the feature expansion board or in the feature expansion unit may execute a part or the whole of the actual processing. As a result, the functions of the aforementioned embodiments can be implemented by the processing. It is goes to say that this case is also included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-32268, filed Feb. 13, 2008 which are hereby incorporated by reference herein in their entirety.

What is claimed is:

1. An image processing apparatus, comprising:
output setting means for setting output configuration settings applied when data stored in a storage unit is output;

reference level setting means for setting a reference level required for the data when the data is outputted in accordance with the output configuration settings;

determination means for determining whether or not the level of the data stored in said storage unit is lower than the reference level;

generation means for generating raised data whose level is raised to the reference level by raising the level of the data stored in said storage unit when said determination means determines that the level of the data stored in said storage unit is lower than the reference level; and output means for outputting the raised data generated by said generation means in accordance with the output configuration settings when said determination means determines that the level of the data stored in said storage unit is lower than the reference level, wherein said output means outputs the data stored in said storage unit in accordance with the output configuration settings when said determination means determines that the level of the data stored in said storage unit is no lower than the reference level.

2. The apparatus according to claim 1, wherein said output setting means sets the output configuration settings either when the stored data is printed or when the stored data is sent.

3. The apparatus according to claim 1, wherein said generation means repeats a process through which the level of the data is raised by 1 level until the level of the data reaches the reference level.

4. The apparatus according to claim 1, wherein the level of the data includes at least one of levels which are a level of data containing bitmap data, a level of data containing bitmap data and character code data for searching, a level of data including point sequence data obtained by linear approximation, a level of data containing a set of curves obtained by curve approximation, and a level of data containing higher quality curves obtained by curve approximation.

5. The apparatus according to claim 1, further comprising control means for allowing said storage unit to store the raised data generated by said generation means.

6. An image processing method for controlling an image processing apparatus comprising a storage unit storing data, the method comprising the steps of:

setting output configuration settings applied when the data stored in the storage unit is output;

setting a reference level required for the data when the data is outputted in accordance with the output configuration settings;

determining whether or not the level of the data stored in the storage unit is lower than the reference level;

generating raised data whose level is raised to the reference level by raising the level of the data stored in the storage unit when it is determined in said determining step that the level of the data stored in the storage unit is lower than the reference level;

outputting the raised data generated in said generating step in accordance with the output configuration settings when it is determined in said determining step that the level of the data stored in the storage unit is lower than the reference level; and outputting the data stored in the storage unit in accordance with the output configuration settings when it is determined in said determining step that the level of the data stored in the storage unit is no lower than the reference level.

7. A non-transitory computer-readable medium comprising a computer-executable computer program stored thereon for causing a computer to execute the steps of:

setting output configuration settings applied when data stored in a storage unit is output;

setting a reference level required for the data when the data is outputted in accordance with the output configuration settings;

determining whether or not a level of the data stored in the storage unit is lower than the reference level;

generating raised data whose level is raised to the reference level by raising the level of the data stored in the storage unit when it is determined in said determining step that the level of the data stored in the storage unit is lower than the reference level;

outputting the raised data generated in said generating step in accordance with the output configuration settings when it is determined in said determining step that the level of the data stored in the storage unit lower than the reference level; and outputting the data stored in the storage unit in accordance with the output configuration settings when it is determined in said determining step that the level of the data stored in the storage unit is no lower than the reference level.

* * * * *